US006952594B2

(12) United States Patent
Hendin (10) Patent No.: US 6,952,594 B2
(45) Date of Patent: Oct. 4, 2005

(54) DUAL-MODE RF COMMUNICATION DEVICE

(75) Inventor: Neil Hendin, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 476 days.

(21) Appl. No.: 10/301,987

(22) Filed: Nov. 22, 2002

(65) Prior Publication Data

US 2004/0102172 A1 May 27, 2004

(51) Int. Cl.[7] .............................. H04M 1/00; H04B 1/10
(52) U.S. Cl. ..................... 455/552.1; 455/302; 455/307
(58) Field of Search ............................. 455/63.1, 67.13, 455/266, 296, 302, 307, 334, 339, 340, 552.1, 553.1

(56) References Cited

U.S. PATENT DOCUMENTS

| | | | | |
|---|---|---|---|---|
| 5,423,064 A | * | 6/1995 | Sakata | 455/437 |
| 5,745,856 A | * | 4/1998 | Dent | 455/552.1 |
| 5,852,772 A | * | 12/1998 | Lampe et al. | 455/226.2 |
| 5,937,013 A | | 8/1999 | Lam et al. | |
| 5,950,119 A | | 9/1999 | McGeehan et al. | |
| 5,963,856 A | | 10/1999 | Kim | |
| 6,351,236 B1 | * | 2/2002 | Hasler | 342/357.09 |
| 6,397,051 B1 | | 5/2002 | Abbasi et al. | |
| 6,584,304 B1 | * | 6/2003 | Thomsen et al. | 455/307 |
| 2001/0051507 A1 | * | 12/2001 | Ichihara | 455/86 |
| 2002/0049075 A1 | * | 4/2002 | Takagi | 455/553 |
| 2002/0058491 A1 | * | 5/2002 | Minnis et al. | 455/323 |

FOREIGN PATENT DOCUMENTS

EP           1164707 A2    5/2000

OTHER PUBLICATIONS

Kal Kalbasi, "Simulating Trade–Offs in W–CDMA/EDGE Receiver Front Ends," Jan. 3, 2002, from CommsDesign (www.commsdesign.com/story/OEG20020103S0048).
Levantino, Samori, Banu, Glas and Boccuzzi, "A CMOS IF Sampling Circuit with Reduced Aliasing for Wireless Applications," Feb. 6, 2002, p. 404.

* cited by examiner

Primary Examiner—Quochien B. Vuong (57) ABSTRACT

A novel RF to IF converter operates in two modes allowing both wide bandwidth signals and narrow bandwidth signals to be processed using the same wide bandwidth bandpass filter as well as a dual-mode image-reject mixer. As a mobile receiver, both wide bandwidth WCDMA or IMT-2000 signals and narrow bandwidth GSM signals pass through the same wide bandwidth channel select filter. In the GSM mode, signals lying to one side of the frequency range of the narrow GSM signal are attenuated by the wide bandwidth channel select filter. Then signals lying to the other side of the GSM signal are attenuated by an image-reject mixer. The image-reject mixer also downconverts the GSM signal. In the WCDMA or IMT-2000 mode, the wide bandwidth channel select filter attenuates signals outside of the WCDMA or IMT-2000 channel bandwidth, and the image-reject mixer downconverts the wide bandwidth signal without rejecting signals.

14 Claims, 8 Drawing Sheets

DUAL-MODE RF COMMUNICATION DEVICE

BACKGROUND

The present invention is directed towards the field of communication devices. More specifically, the present invention relates to handsets for mobile communication systems.

Presently, wireless communication devices and networks are based on various technical standards for sending and receiving radio signals. Wireless communication devices can communicate within a network only if they are in the vicinity of a base station that uses a standard supported by the communication devices. A number of communication protocols are currently used for wireless communication. For example, Global System for Mobile Communication (GSM), a "narrowband" radio frequency (RF) signal and Wideband Code Division Multiple Access (WCDMA), a "wideband" frequency (RF) signal under the IMT-2000 protocol are in widespread use. Currently, communication devices designed to operate with one of these protocols, for example with GSM, cannot operate with the other protocol, for example, WCDMA.

To operate with both narrowband and wideband signals, a communication device needs a receiver having electronic circuits capable of processing both the narrowband and wideband signals. However, such communication device would have increased costs due to duplicative component requirements and reduced mobility due to bulkiness of the duplicative components. This is because such communication device would need all the components required to support both the narrowband and wideband signals. There remains a need for a device and techniques to support both wideband and narrowband communication protocols while reducing component requirements.

SUMMARY

The need is met by the present invention. In one embodiment of the present invention, a communication apparatus includes a dual mode receiver. The receiver includes a narrowband signal mixer adapted to downconvert a narrowband radio frequency (RF) signal to a narrowband intermediate frequency (IF) signal (the narrowband IF signal having a narrowband IF signal carrier component, a first IF noise component having frequencies outside the narrowband IF carrier component, and a second IF noise component also having frequencies outside the narrowband IF carrier component) such that the narrowband IF carrier component lies within but near a limit of a predetermined range of signal frequencies. A bandpass filter, connected to the narrowband signal mixer, is adapted to allow signals within the predetermined range to pass through such that, when the narrowband IF signal is introduced, the first IF noise component is filtered out while the narrowband IF carrier component and a portion of the second IF noise component passes through. Then, a dual-mode image-reject mixer (DMIRM), connected to said bandpass filter, further attenuates the second IF noise component, thereby passing the desired carrier component to the next stage.

In another embodiment of the present invention, a method of processing radio frequency (RF) signals for communication is disclosed. First, a narrowband radio frequency (RF) signal is downconverted to a narrowband intermediate frequency (IF) signal (the narrowband IF signal having a narrowband IF carrier component, a first IF noise component having frequencies outside the narrowband IF carrier component, and a second IF noise component also having frequencies outside the narrowband IF carrier component) such that the narrowband IF carrier component lies within but near a limit of a predetermined range of signal frequencies. Then, the first IF noise component is filtered out while allowing the narrowband IF carrier component and portions of the second IF noise component to pass through. Finally, the second IF noise component is attenuated thereby leaving the desired carrier component of the IF signal.

Other embodiments and advantages of the present invention will become apparent from the following detailed description, taken in combination with the accompanying drawings, illustrating by way of example the principles of the invention.

DETAILED DESCRIPTION

As shown in the subsequent drawings for purposes of illustration, the present invention is embodied in a novel device as well as a novel method for processing both a narrow bandwidth signal and a wide bandwidth signal using a single receiver. In particular, the present invention is embodied in a communication device having a receiver with a bandpass filter that can be used to filter both the wideband signals (in an intermediate frequency (IF) form) and the narrowband signals (in an intermediate frequency (IF) form). Further, a dual-mode image-reject mixer (DMIRM) connected to the bandpass filter processes both the wideband signals and the narrowband signals. Accordingly, a dual-mode communication device (supporting both narrowband and wideband protocols) can be manufactured having reduced number of components thus reducing cost and bulkiness.

Although the present invention may be utilized in accordance with a variety of radio protocols and standards, an apparatus in one embodiment of the present invention processes both a narrow bandwidth GSM signal and a wide bandwidth WCDMA signal. Other embodiments of the present invention can process, for example, narrow bandwidth D-AMPS (Digital-Advanced Mobile Phone Service), GPRS (General Packet Radio Services) or EDGE (Enhanced Data Rates for GSM Evolution) signals together with wide bandwidth TD-SCDMA (Time Division—Synchronous Code Division Multiple Access) or cdma2000 (Code Division Multiple Access) signals. Moreover, other embodiments are possible that can process a narrow bandwidth signal from any narrowband radio standard together with a wide bandwidth signal from any wideband radio standard.

Examples of narrowband first and second generation radio standards are: advanced mobile phone system (AMPS), TACS (Total Access Communications System), NMT (Nordic Mobile Telephone), digital AMPS (D-AMPS), cdmaOne, GSM, GPRS, and EDGE. The American National Standards Institute has defined D-AMPS as interim standard (IS) 136, which is based on TDMA (time division multiple access). cdmaOne is known as IS-95A or IS-98C, which are based on CDMA (code division multiple access).

Third generation wideband radio standards ("3G") include cdma2000 and two UMTS Terrestrial Radio Access standards, which are UTRA FDD (WCDMA) and UTRA-TDD (TD-SCDMA). TD-SCDMA refers to time division synchronous code division multiple access, a UMTS standard adopted by China that relies on TDD. TDD denotes time division duplex. cdma2000, WCDMA and TD-SCDMA each belongs to the IMT-2000 radio standard, a family of radio standards for 3G networks promulgated as International Mobile Telecommuncations 2000 by the International Telecommunication Union (ITU). UMTS means universal mobile telecommunications system, a term for network types that conform to one of the IMT-2000 radio standards.

Figure 1:
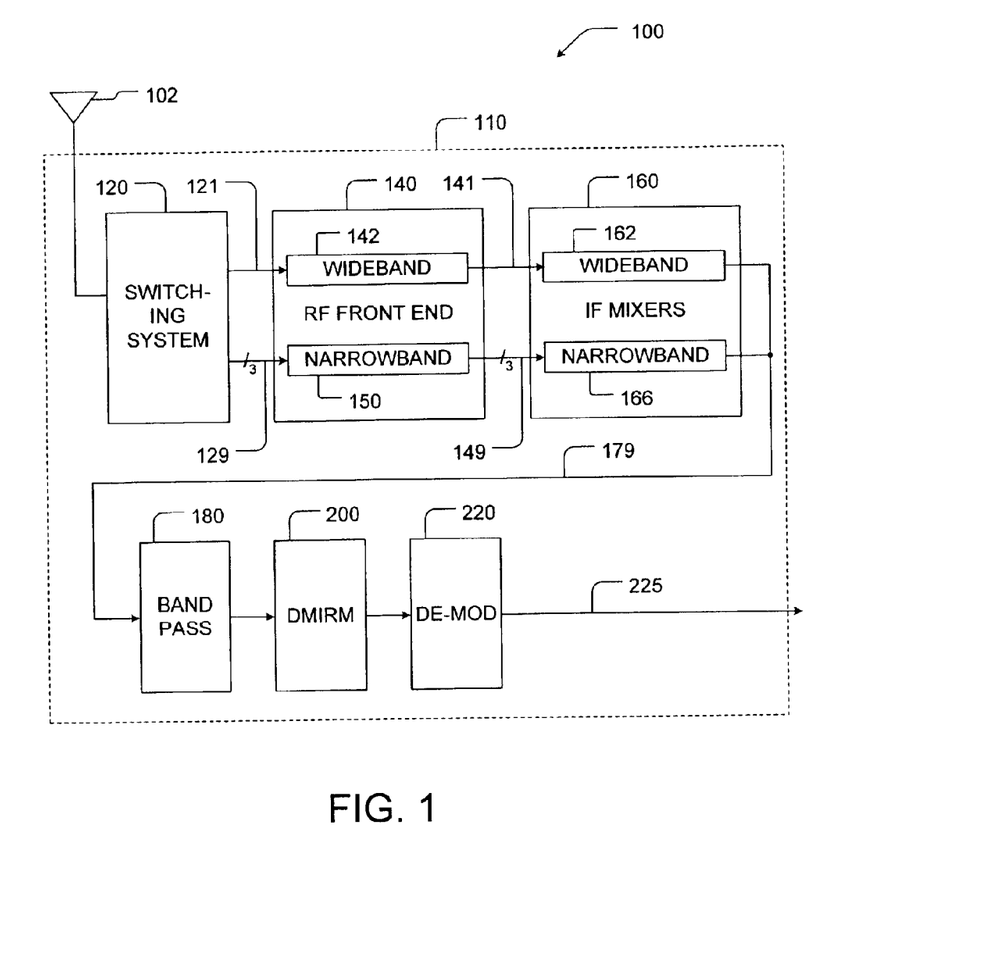
FIG. 1 is a schematic block diagram of an RF receiver of a dual mode communications apparatus in accordance with one embodiment of the present invention.

FIG. 1 is a block diagram of a receiver 100 of a communication device according to one embodiment of the present invention including an RF to IF converter 110. The receiver 100 operates in two modes: a wideband mode and a narrowband mode. Referring to FIG. 1, a multi-band antenna 102 is connected to a switching system 120. RF signals detected by the antenna 102 is routed by the switching system 120 to various portions of the receiver 100 for reception. The switching system 120 also allows the multi-band antenna 102 to be used for both the reception and the transmission functions by connecting the antenna 102 to transmit lines shown in FIG. 2.

Figure 2:
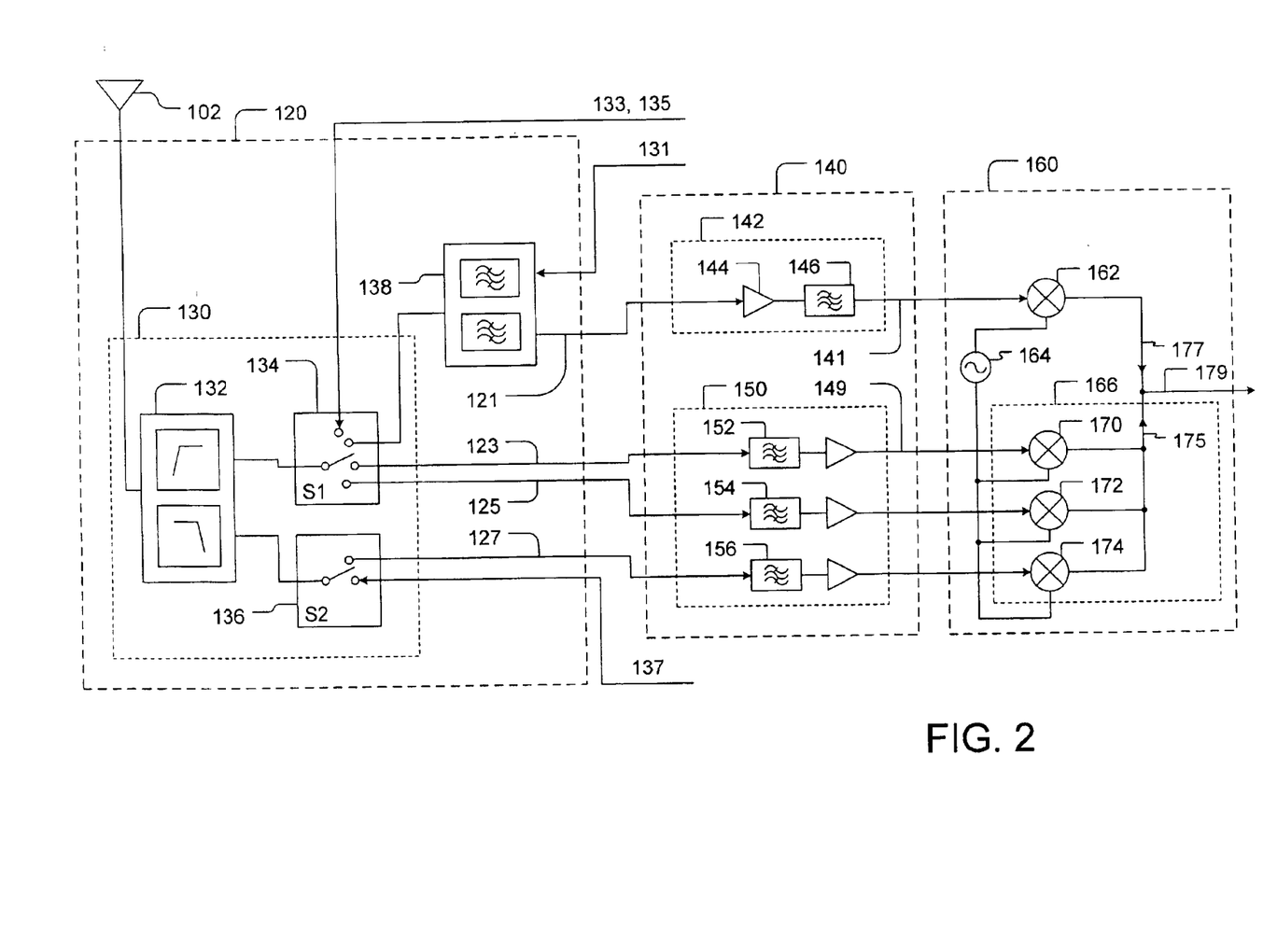
FIGS. 2 and 3 illustrate the RF receiver of FIG. 1 in greater detail.
Figure 3:
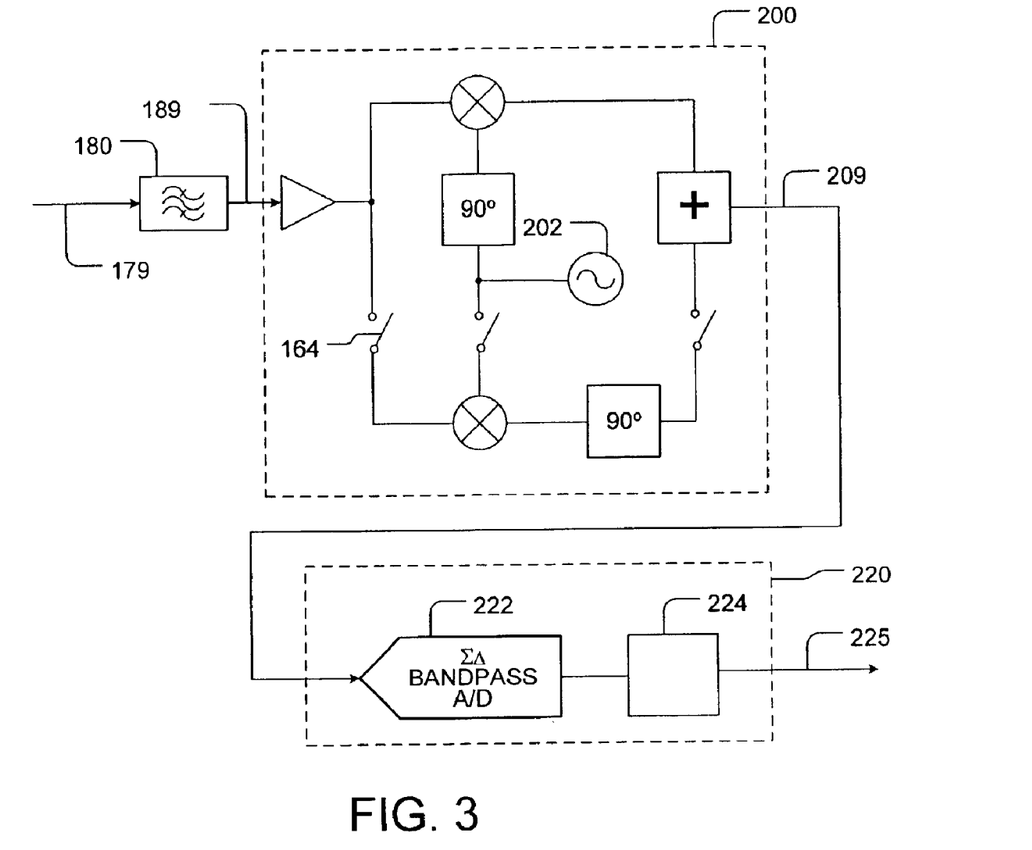

The GSM RF signal detected by the antenna 102 is routed by the switching system 120 to an RF front end 140, where it is amplified and filtered so that a desired communications band is selected. Then, the amplified and filtered RF signal is downconverted to a narrowband intermediate frequency (NIF) signal 175 by an IF mixer in an IF mixing system 160. The downconverted IF signal includes IF GSM signal components as well as IF noise components. The IF noise components being any components of the IF signal other than the IF GSM signal components. Next, the NIF signal 175 is filtered using a bandpass filter 180. The bandpass filter 180 is designed to allow a predetermined band, a passband, of IF signals to pass while filtering out, or reducing signal strength of, other IF signals. The bandpass-filtered IF signal is then mixed once again by dual-mode image reject mixer (DMIRM) 200 to a second IF signal. The DMIRM 200 is "dual-mode" because the DMIRM operates in a wideband mode and a narrowband mode as discussed below in more detail. A demodulation circuit 220 receives the second IF signal from the DMIRM 200. Within the demodulation circuit 220, a sigma-delta bandpass A/D converter 222 of FIG. 3, converts the analog second IF signal to a digital signal, which is then demodulated to baseband I ("In" phase) and Q ("Quadrature" phase) signals by a digital IQ demodulator 224. The output of the demodulation circuit 220 is a digital baseband signal 225, which is sent to a baseband signal processor, not shown, to recover the transmitted information. The baseband signal processors are known in the art. FIGS. 2 and 3 illustrate portions of the receiver 100 of FIG. 1 in more detail.

In the Figures of the present disclosure, single connecting signal lines (i.e., conductors) are shown for simplicity. The actual receiver architecture is likely to use differential connections, which are double conductors between nodes. Noise performance can be optimized when signals travel as differential signals.

Wideband Mode

Referring to FIGS. 1 and 2, in a wideband mode, the receiver 100 receives a RF signal, for example WCDMA signal, from the multi-band antenna 102. A switch 130 (within the switching system 120) routes the received RF signal through an antenna duplexer 138 that splits the transmit and the receive paths. The antenna duplexer 138 is used because WCDMA operates in full duplex mode, and the received RF (for example WCDMA) signal 121 and a WCDMA transmit signal 131 are transmitted and received simultaneously using the same antenna 102. For convenience, the received RF signal (WCDMA) is also referred to as wideband radio frequency input (WRF IN) 121.

Routing and RF Front End

The received RF (WCDMA) signal 121 is thus routed to an RF front end 140. More specifically, in the wideband mode, the received RF signal 121 is routed to a wideband RF front end 142 where it is amplified by an amplifier 144 and processed by a RF bandpass filter 146 to allow the desired portion of the received RF signal 121 to pass. For example, if the receiver 100 is receiving WCDMA signals from the 2140 MHz band, the wideband RF front end 142 filters out signals that are outside the reception carrier frequency band 2110 MHz to 2170 MHz. In addition to the desired signal band, other RF signals having frequencies higher and lower than that of signal 121, but yet within the reception carrier frequency band, also pass though the RF bandpass filter of the wideband RF front end 142.

Downconversion to First Intermediate Frequency

Then, the amplified and filtered RF signal 141 is downconverted to the wideband intermediate frequency (WIF) signal 177, also referred to as a first IF, by an IF mixer in an IF mixing system 160. More specifically, in the wideband mode, the amplified and filtered RF signal 141 is mixed with a first local oscillator (LO) 164 having a frequency that downconverts the amplified and filtered RF signal 141 to a WIF signal 177 that has a frequency centered at 190 MHz. The frequency of the first LO 164 is between 2300 MHz and 2360 MHz to downconvert the amplified and filtered RF signal 141 to 190 MHz in the wideband mode. In comparison, the frequency of the first LO 164 is between 1125 MHz and 1150 MHz to convert received RF signal (in case of narrowband GSM signals of the 900 MHz band) to about 190 MHz in the narrowband mode. Note that the WIF signal 177 contains a downconverted amplified and filtered RF signal 141 including downconverted signals having frequencies higher and lower than that of the desired signal band. Because the receiver 100 operates in either in the wideband mode or in the narrowband mode but not both simultaneously, the output of the IF mixing system 160, whether it be the WIF signal 177 or a narrowband intermediate frequency signal 175, is referred to, for convenience, as the first IF signal 179.

In the embodiment in which both a narrow bandwidth GSM signals 149 and a wide bandwidth WCDMA signal 141 are processed, each signal band has a separate mixer (162 for the wideband and 170–174 for the narrowband), low noise amplifier (LNA) and bandpass filters as illustrated in FIG. 2. To reduce the overall number of components and space occupied by the components, one tunable RF local oscillator (LO) 164 is used. The first RF LO 164 that produces an oscillating frequency from 900 MHz to 1380 MHz is used to produce all of the frequencies of the first LO signal 164 by doubling or dividing the frequency where required.

Bandpass

Figure 4:
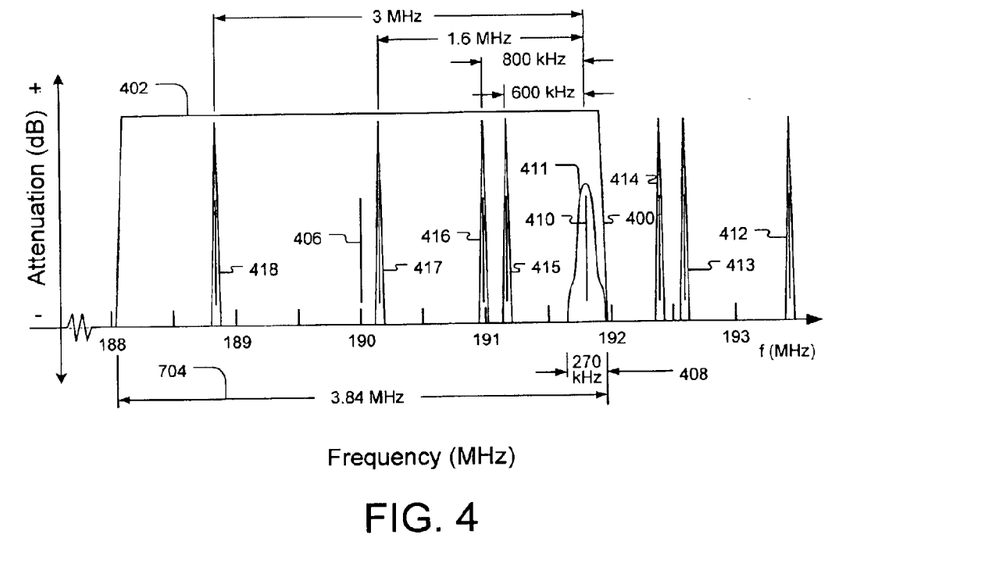
FIG. 4 is a diagram of the frequencies of a narrow bandwidth GSM signal and the bandpass region of a wide bandwidth bandpass filter.

Continuing to refer to FIG. 1 but also referring to FIG. 3, the first IF signal 179 includes, in the wideband mode, wideband IF WCDMA components as well as IF noise components. The IF noise components being any components of the IF signal other than the IF WCDMA components. The first IF signal 179 is filtered using the bandpass filter 180. The bandpass filter 180 is designed to allow a predetermined range of signal frequencies, a passband, of IF signals to pass through while filtering out other IF signals. The bandpass filter 180 is typically designed to bandpass the WCDMA wideband IF signal and, in one embodiment, has a bandpass range of 3.84 MHz and a center bandpass frequency of approximately 190 MHz as illustrated in FIG. 4. FIG. 4 illustrates the passband 402 having these characteristics with an upper limit, or upper edge, near 192 MHz. The filtered first IF signal 179 is designated filtered IF signal 189.

Dual-Mode Image Reject Mixer (DMIRM)

Continuing to refer to FIGS. 1 and 2, the bandpass-filtered IF signal 189 is then mixed once again by dual-mode image reject mixer (DMIRM) 200. The DMIRM 200 is "dual-mode" because the DMIRM operates in a wideband mode and a narrowband mode. In the wideband mode, the DMIRM 200 mixes the filtered IF signal 189 with a second LO signal 202 to downconvert the filtered IF signal 189 into a second IF signal 209. The frequency of the second LO signal 202 is chosen to yield a second IF signal 209 having a frequency that can easily be both (i) formed from the WCDMA sample clock and (ii) sampled by the WCDMA sample clock.

The WCDMA standard allows for a sample clock rate of 15.36 MHz, which is four times the standard WCDMA chip rate of 3.84 MHz. Later, when the second IF signal 189 undergoes digital IQ demodulation in the digital IQ demodulator 220, it is advantageous to have a digital second IF LO with the same frequency as the second IF signal 189. A digital second IF LO with a 768 kHz frequency can be formed by dividing the sample clock rate of 15.36 MHz by twenty. Furthermore, it is advantageous to chose an analog-to-digital sample rate that is 4/n (n=1, 3, 5, . . .) times the second IF signal 189. In one embodiment, n=3 and an analog-to-digital sample rate of ⁴⁄₃ of the second IF frequency of 768 kHz, i.e., 1.024 MHz, can be formed by dividing the sample clock rate of 15.36 MHz by fifteen.

Demodulation

The demodulation circuit 220 receives the second IF signal from the DMIRM 200. Within the demodulation circuit 220, a sigma-delta bandpass A/D converter 222, converts the analog second IF signal 209 to a digital signal, which is then demodulated to baseband I ("In" phase) and Q ("Quadrature" phase) signals by a digital IQ demodulator 224. The output of the demodulation circuit 220 is a digital baseband signal 225, which is sent to a baseband signal processor, not shown, to recover the transmitted information. The baseband signal processors are known in the art.

Narrowband Mode

Referring again to FIGS. 1 and 2, in a narrowband mode, the receiver 100 receives the RF signal, for example a narrowband GSM signal, from the multi-band antenna 102. The antenna 102 may receive GSM signals on any GSM band. For example, the received RF signal may be 900 MHz-band GSM signal 127, 1800 MHz-band GSM signal 123, and 1900 MHz-band GSM signals 125.

Routing and RF Front End

The switching system 120 includes a switch 130 that is used to route the GSM receive signals 123, 125, and 127. The switch 130 includes a diplexer 132 that selects between high frequency bands, such as GSM 1800 MHz, GSM 1900 MHz, and WCDMA 2140 MHz, and low frequency bands, such as GSM 450 MHz (not shown) and GSM 900 MHz. The switch 130 further includes two sub-switches 134 and 136 that route the various transmit signals to and from the antenna 102 and the RF front end 140. The antenna duplexer 138 is not needed to process GSM signals 123, 125, and 127 because GSM operates in half duplex mode. GSM transmit signals 133, 135, and 137 and GSM receive signals 123, 125, and 127 are not transmitted and received simultaneously. The communications device with the receiver 100 includes an associated transmit side, not shown, whose GSM transmit signals 137 (at 900 MHz), 133 (at 1800 MHz), 135 (at 1900 MHz), and WCDMA transmit signals 131 are coupled to the antenna 102 via the switch system 120.

Each received RF (GSM) signal 123, 125, or 127 is accompanied by other undesired (noise) signals, at least one such signal being higher in frequency (first noise component) than each GSM signal and another such signal being lower in frequency (second noise component) than each GSM signal. For convenience, any one of the received RF (GSM) signals 123, 125, and 127, generically, is also referred to as narrowband radio frequency input (NRF IN) 129 unless otherwise noted.

The received narrowband RF (GSM) signal 129 is routed to an RF front end 140. More specifically, in the narrowband mode, the received RF (GSM) signal 129 is routed to a narrowband RF front end 150 where it is filtered by a filter 152, 154, or 156, and amplified. The narrowband RF front end 150 includes the appropriate bandpass filter to select the desired GSM band. For example, if the communication device including the receiver 100 is receiving GSM signals on both the 900 MHz and the 1800 MHz bands, then the band with the strongest signal can be selected and other bands filtered out. The filtered signal is amplified.

Downconversion to First Intermediate Frequency

The resulting filtered and amplified signal, generically referred to as the filtered and amplified signal 149, is sent to one of narrowband mixers 170, 172, or 174, depending on whether a filtered and amplified RF input signal originated from a 900 MHz-band signal 156, a 1800 MHz-band signal 152, or a 1900 MHz-band signal 154, respectively as illustrated. One of the mixers 170, 172, or 174 mixes the filtered and amplified RF input signal 149 with a first local oscillator (LO) signal 164 having a frequency that downconverts the filtered and amplified RF input signal 149 to a narrowband intermediate frequency (NIF) 175 with a frequency of about 190 MHz.

For example, the narrowband signal mixer 170 is adapted to downconvert the narrowband filtered and amplified RF input signal 149 into NIF signal 175 centered around 190 MHz. The frequency of the first LO 164 is between 1125 MHz and 1150 MHz to convert received RF signal (in case of narrowband GSM signals of the 900 MHz band) to about 190 MHz in the narrowband mode. Note that the NIF signal 175 contains a downconverted filtered and amplified RF signal 149 including downconverted signals having frequencies higher and lower than that of the desired signal band. Because the receiver 100 operates in either in the wideband mode or in the narrowband mode but not both simultaneously, the output of the IF mixing system 160, whether it be the WIF signal 177 or the NIF signal 175, is referred to, for convenience, as the first IF signal 179.

FIG. 4 illustrates various components of the NIF signal 175 which is also the first IF signal 179 in the narrowband mode. Referring to FIG. 4, the first IF signal 179 includes a narrowband IF GSM signal component 411 (also referred to as the "carrier component" 411) which includes the desired data, a first IF noise component signals (412, 413, and 414), and a second a second IF noise component signals (415 to 418, inclusive). These noise component signals (412 to 418, inclusive) are shown for illustrative purposes only; the first IF signal 179 may include other noise component signals, both higher and lower in frequency than the GSM signal component 411. For convenience of discussion, the noise components having signal frequencies higher than the GSM signal component 411 are designated as the first noise component signals (412, 413, and 414), and the noise components having signal frequencies lower than the GSM signal component 411 are designated as the second noise component signals (415–418). In actual implementation, this can be reversed. The GSM signal component 411 is illustrated as a carrier bandwidth 408 of approximately 280 KHz which is in accordance with the GSM radio standard.

The noise components 412–418 may be from atmospheric noise or from GSM RF signals from undesired base stations as frequencies are re-used in distant cells. Further, the GSM standard contemplates testing the ability of a receiver to process a desired GSM signal that is accompanied by undesired signals at certain intervals from the desired GSM signal. These accompanying undesired noise signals are sometimes called "blockers." Blockers are often at frequencies having known frequency intervals from the GSM signal component signal 411. For example, as illustrated, the blocker signals appear on either side (higher and lower frequency sides) of the GSM signal component signal 411 at intervals of 0.6 MHz, 0.8 MHz, 1.6 MHz, and 3 MHz. In the sample embodiment illustrated in the Figures, blockers 412–414 are filtered out by the wide bandwidth bandpass filter 180 because they lie outside the passband 402. The remaining blockers 415–418 are attenuated by the DMIRM 200 as discussed in more detail below.

Referring again to FIGS. 1 and 2 and also referring to FIG. 4, when the narrowband signal mixer 170 downconverts the filtered and amplified narrowband RF input signal 149 to the NIF signal 175, the first LO 164 frequency is chosen such that the NIF signal 175 GSM signal component 411 of the NIF signal 175 lies within but near a limit 400 of a predetermined range 402 of signal frequencies. In FIG. 4, the GSM signal component 411 of the NIF signal 175 lies within but near the upper limit 400 of the passband 402 of the bandpass filter 180.

As already discussed, the passband 402 is designed to allow IF signals from the wideband WCDMA signals to pass through. Accordingly, the passband 402 is much wider than the GSM signal component 411 of the first IF signal 179. By designing the narrowband mixers (170, 172, and 174) and the first LO 164 to result in the first IF signal 179 to be near one of the limits of the passband 402, the first noise component (412–414) of the first IF signal 179 can be filtered out from first IF signal 179 by the bandpass filter 180. For example, in order to place the GSM signal component 411 within but near the upper edge 400 of the passband 402 of the bandpass (WCDMA) filter 180, the GSM signal component 411 is centered 410 at 191.785 MHz.

Bandpass

Continuing to refer to FIGS. 1, 3, and 4, the first IF signal 179 includes, in the narrowband mode, narrowband IF GSM signal component 411 as well as the first and second IF noise components (412–418) as discussed above. The first IF signal 179 is filtered using the bandpass filter 180 which is designed to allow the signals having frequencies within the passband 402 to pass through while filtering out other IF signals. The bandpass filter 180 is typically designed to bandpass the WCDMA wideband IF signal and, in the illustrated embodiment, has a bandpass range of 3.84 MHz and a center bandpass frequency of approximately 190 MHz. FIG. 4 illustrates the passband 402 having these characteristics with an upper limit, or upper edge, near 192 MHz.

In the present example, the first noise component (412–414) are filtered out, or signal strength of the first noise component (412–414) is reduced while the narrowband IF GSM signal component 411 and portions of the second noise component (415–418) are allowed to pass through the bandpass filter 180. This is because the narrowband IF GSM signal component 411 and portions of the second noise component (415–418) are within the bandpass 402. The filtered first IF signal 179 is designated filtered IF signal 189.

Dual-Mode Image Reject Mixer (DMIRM)

Continuing to refer to FIGS. 1 and 3, the filtered IF signal 189 is then mixed once again by dual-mode image reject mixer (DMIRM) 200 with a second IF LO signal 202. The DMIRM 200 is "dual-mode" because the DMIRM operates in a wideband mode and a narrowband mode. Further, in the narrowband mode, the DMIRM 200 is adapted to attenuate the second IF noise component which passed through the bandpass filter 180. In addition, the DMIRM 200 mixes the filtered first IF signal 189 with a second LO signal 202 having a frequency that downconverts the filtered first IF signal 189 to a second IF signal 209 with a frequency of about 768 kHz. The frequency of the second LO signal 202 is chosen to yield a second IF having a frequency that can easily be both (i) formed from the WCDMA sample clock and (ii) sampled by the WCDMA sample clock.

The WCDMA standard allows for a sample clock rate of 15.36 MHz, which is four times the standard WCDMA chip rate of 3.84 MHz. Later, when the second IF signal 189 undergoes digital IQ demodulation in the digital IQ demodulator 220, it is advantageous to have a digital second IF LO with the same frequency as the second IF signal 189. A digital second IF LO with a 768 kHz frequency can be formed by dividing the sample clock rate of 15.36 MHz by twenty. Furthermore, it is advantageous to chose an analog-to-digital sample rate that is 4/n (n=1, 3, 5, . . .) times the second IF signal 189. In one embodiment, n=3 and an analog-to-digital sample rate of 4/3 of the second IF frequency of 768 kHz, i.e., 1.024 MHz, can be formed by dividing the sample clock rate of 15.36 MHz by fifteen.

There are various types of commonly-known image-reject mixers, such as downconversion and upconversion mixers, low-side reject mixers and high-side reject mixers, Hartley mixers and Weaver mixers. Care is taken to incorporate the correct type of image-reject mixer into the DMIRM 200 so that the signal attenuated is of a lower frequency (the second noise component) than the GSM signal component 411 when the signal filtered out-is a higher frequency (the first noise component) than the GSM signal component, and visa versa. For example, the DMIRM 200 can be a downconversion, low-side reject mixer.

Figure 5:
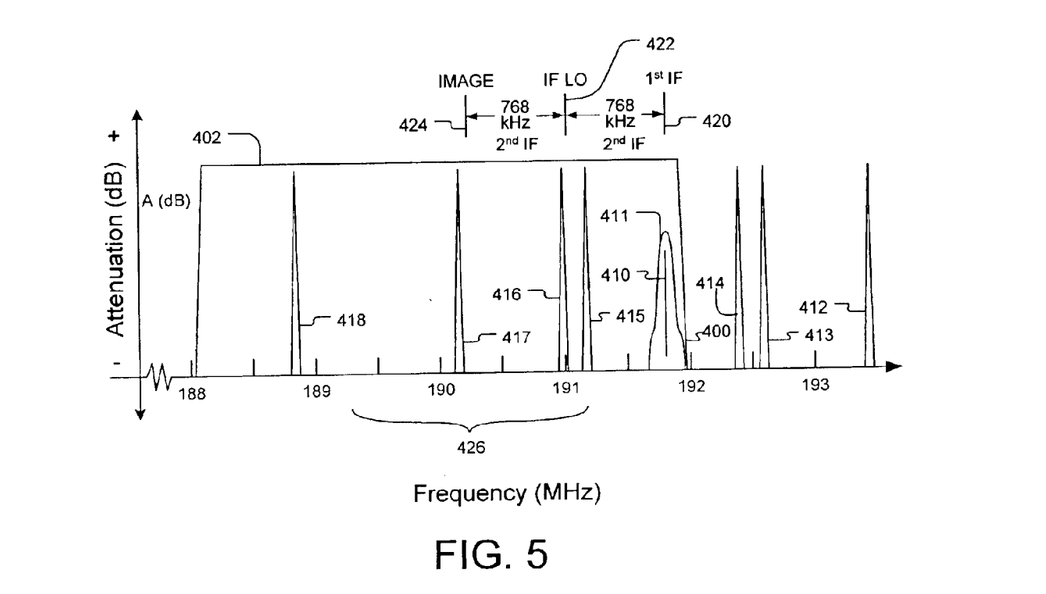
FIG. 5 is a diagram of the frequencies of a narrow bandwidth GSM signal and the bandpass region of a wide bandwidth bandpass filter showing the region of image rejection.

FIG. 5 illustrates the image reject frequency band 426 where the greatest image-rejection is achieved by the DMIRM 200. The DMIRM 200 receives the filtered IF signal 189 from the wide bandwidth bandpass filter 180. The center frequency 410 of the GSM signal component 411 of the filtered IF signal 189 has been placed at the center frequency 720 of the filtered IF signal 189. The DMIRM mixes the filtered IF signal 189 with the second LO signal 202, also referred to as the intermediate frequency (IF) LO 202. The second LO signal 202 is chosen with a frequency 422 halfway between the center frequency 410 of the GSM carrier signal and the frequency 424 where the maximum image-rejection is to be achieved. The frequency 424 is also referred to as the "image frequency" or just "image."

The image rejection achieved by the DMIRM 200 attenuates not only the blocker 417 closest to the image frequency 424, but also other blockers 415, 416 and 418. The GSM carrier signal 411 and the attenuated blockers 415, 416 and 418 are output from the DMIRM 200 as the second IF 209 whose frequency 768 KHz equals the difference in frequency between the IF LO frequency 422 and the center frequency 420 of the filtered IF signal 189.

Figure 6:
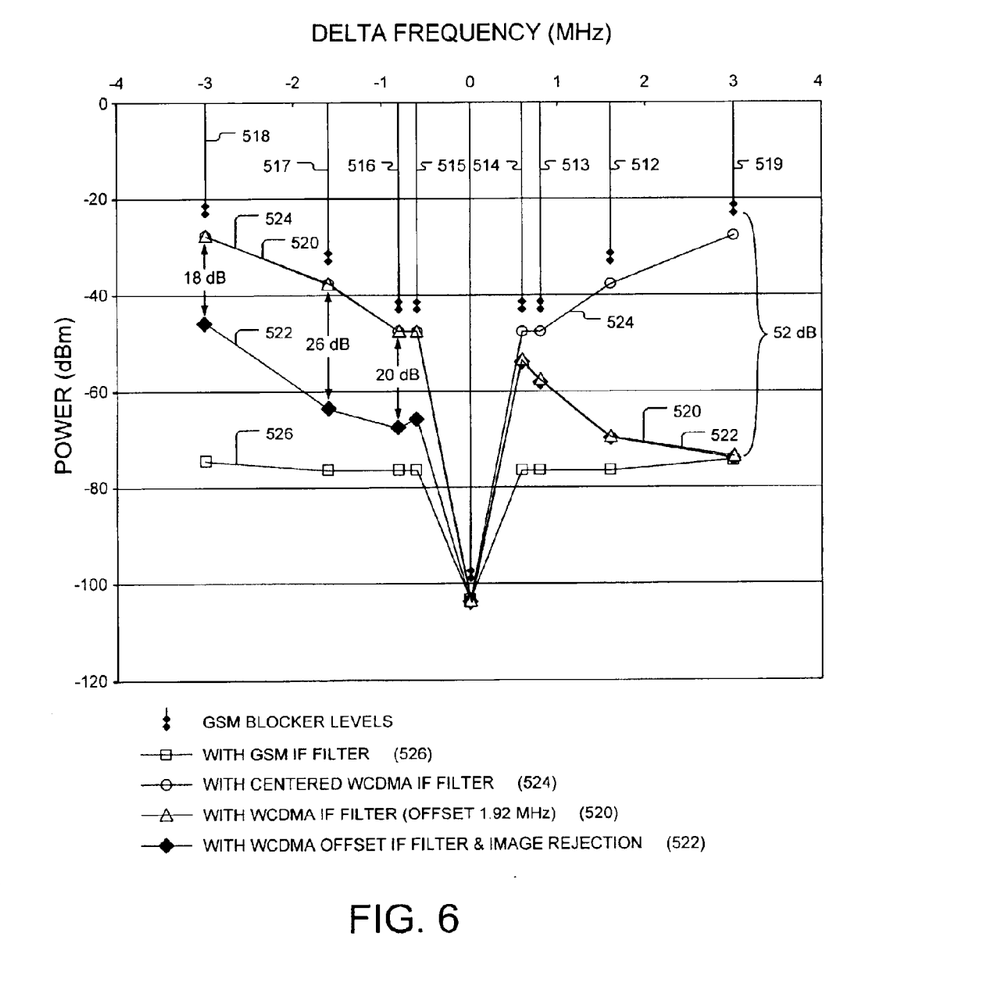
FIG. 6 shows the relative amounts of attenuation of signals by a wide bandwidth bandpass filter and a dual-mode image-reject mixer.

FIG. 6 shows the relative amounts of attenuation of the blockers resulting from the wide bandwidth bandpass filter 180 and the DMIRM 200. Table 1 below is a table listing the values of the attenuation shown in FIG. 6.

TABLE 1

| OFFSET FREQUENCY (MHz) | GSM IF FILTER ATTENUATION (dB) | WCDMA IF FILTER ATTENUATION (dB) | IMAGE REJECTION F (IF) = 768 kHz (dB) |
|---|---|---|---|
| −3 | 52 | 6.01 | 18 |
| −1.6 | 44 | 5.8 | 26 |
| −0.8 | 34 | 5.781 | 20 |
| −0.6 | 34 | 5.816 | 18 |
| 0 | 5 | 5.988 | 0 |
| 0.6 | 34 | 11.8 | 0 |
| 0.8 | 34 | 16.12 | 0 |
| 1.6 | 44 | 38 | 0 |
| 3 | 52 | 52 | 0 |

FIG. 6 shows the signal components of the second IF signal 202, including the frequency location and relative power of the downconverted blockers 512 through 518, which correspond to blockers 412 through 418, respectively. Blocker 519, which has a frequency of 3 MHz higher than GSM carrier signal 411, is also shown. The attenuation achieved on the blockers 512–519 from the wide bandwidth bandpass filter 180 (WCDMA IF filter) alone when the narrowband IF (GSM) signal 175 is placed at the upper edge 400 of the passband 402 is shown in curve 520. Curve 522 shows the attenuation from the WCDMA IF filter 180 plus the DMIRM 200. Curve 524 corresponds to the attenuation on blockers 512–519 when GSM signal 175 is centered on the passband 402 of the WCDMA IF filter 180.

FIG. 6 illustrates that an attenuation of 52 dB is achieved by the WCDMA IF filter 180 on the downconverted blocker 519. On the other hand, filter 180 passes blocker 517, which has a frequency of 1.6 MHz lower than the GSM carrier signal 411, and attenuates blocker 517 by only 5.8 dB. The DMIRM 200 then further attenuates blocker 517 by 26 dB. The DMIRM 200 also attenuates blockers 516 and 518 by 20 dB and 18 dB, respectively.

Further, FIG. 6 shows with curve 526, as a comparison, the attenuation in blocker strength that would be achieved if a dedicated GSM narrow bandwidth bandpass filter (GSM IF filter) were used. The attenuation in blocker strength achieved by the combination of the wide bandwidth bandpass filter 180 and the DMIRM 200 approaches the attenuation achieved by a narrow bandwidth bandpass filter designed specifically to process GSM signals.

Figure 7A:
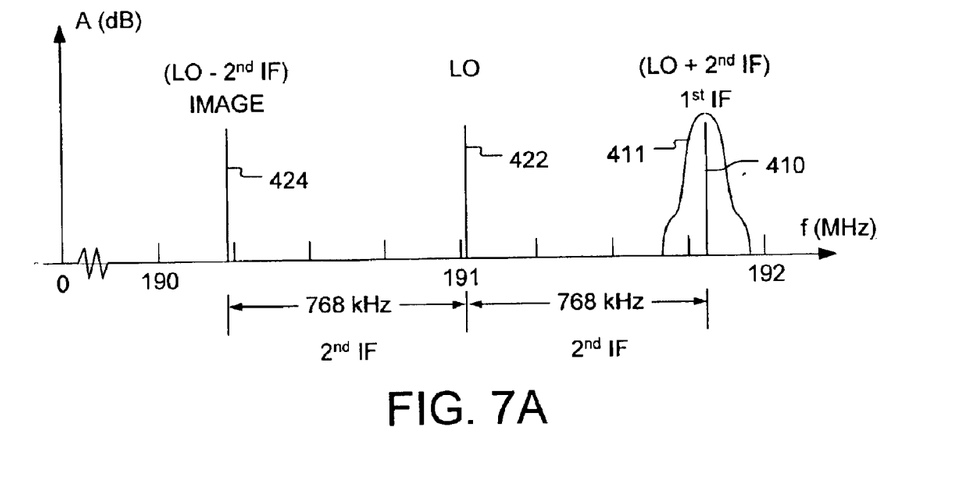
FIG. 7A is a diagram of the frequencies of the inputs and outputs of an image-reject mixer as shown in FIG. 7B.
Figure 7B:
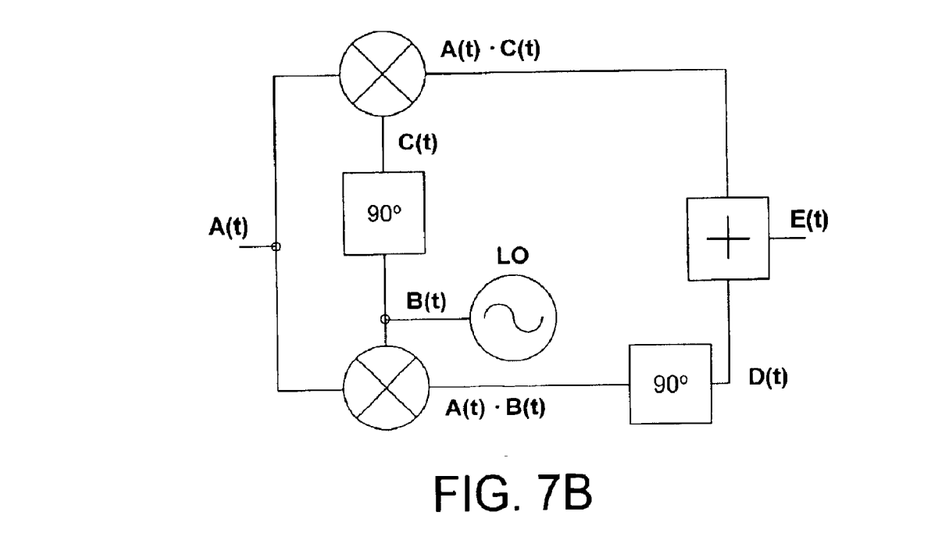
FIG. 7B is a block diagram of the configuration of a dual-mode image-reject mixer in a narrowband mode in one embodiment of the present invention.

FIGS. 7A and 7B and Table 2 below illustrate additional aspects of the operations of the DMIRM 200 in the embodiment in which both a narrow bandwidth GSM signal and a wide bandwidth WCDMA signal are processed. FIG. 7B is a block diagram of the configuration of the DMIRM 200 of FIGS. 1 and 3 in a narrowband mode.

TABLE 2

FOR $1^{st}$ IF $A(t) = \cos(\omega_{LO} + \omega_{IF})t$
$B(t) = \cos(\omega_{LO})t$
$C(t) = \cos[(\omega_{LO})t - \pi/2] = -\sin(\omega_{LO})t$
$A(t) \cdot C(t) = \cos(\omega_{LO} + \omega_{IF})t \cdot -\sin(\omega_{LO})t$
$A(t) \cdot C(t) = -\frac{1}{2}\sin(-\omega_{IF})t - \frac{1}{2}\sin(2\omega_{LO} + \omega_{IF})t$
$A(t) \cdot B(t) = \cos(\omega_{LO} + \omega_{IF})t \cdot \cos(\omega_{LO})t$
$A(t) \cdot B(t) = \frac{1}{2}\cos(2\omega_{LO} + \omega_{IF})t + \frac{1}{2}\cos(\omega_{IF})t$
$D(t) = A(t) \cdot B(t)$ phase shifted by $-\pi/2$
$D(t) = \frac{1}{2}\cos[(2\omega_{LO} - \omega_{IF})t - \pi/2] + \frac{1}{2}\cos[(-\omega_{IF})t - \pi/2]$
$D(t) = -\frac{1}{2}\sin(2\omega_{LO} - \omega_{IF})t - \frac{1}{2}\sin(-\omega_{IF})t$
$E(t) = A(t) \cdot C(t) + D(t) = -\frac{1}{2}\sin(-\omega_{IF})t - \frac{1}{2}\sin(2\omega_{LO} + \omega_{IF})t - \frac{1}{2}\sin(2\omega_{LO} - \omega_{IF})t - \frac{1}{2}\sin(-\omega_{IF})t$
$E(t) = \sin(\omega_{IF})t - \frac{1}{2}\sin(2\omega_{LO} + \omega_{IF})t - \frac{1}{2}\sin(2\omega_{LO} - \omega_{IF})t$
FOR IMAGE $A(t) = \cos(\omega_{LO} - \omega_{IF})t$
$B(t) = \cos(\omega_{LO})t$
$C(t) = \cos[(\omega_{LO})t - \pi/2] = -\sin(\omega_{LO})t$
$A(t) \cdot C(t) = \cos(\omega_{LO} - \omega_{IF})t \cdot -\sin(\omega_{LO})t$
$A(t) \cdot C(t) = -\frac{1}{2}\sin(\omega_{IF})t - \frac{1}{2}\sin(2\omega_{LO} - \omega_{IF})t$
$A(t) \cdot B(t) = \cos(\omega_{LO} - \omega_{IF})t \cdot \cos(\omega_{LO})t$
$A(t) \cdot B(t) = \frac{1}{2}\cos(2\omega_{LO} - \omega_{IF})t + \frac{1}{2}\cos(-\omega_{IF})t$
$D(t) = A(t) \cdot B(t)$ phase shifted by $-\pi/2$
$D(t) = \frac{1}{2}\cos[(2\omega_{LO} - \omega_{IF})t - \pi/2] + \frac{1}{2}\cos[(-\omega_{IF})t - \pi/2]$
$D(t) = -\frac{1}{2}\sin(2\omega_{LO} - \omega_{IF})t + \frac{1}{2}\sin(\omega_{IF})t$ TABLE 2-continued $E(t) = A(t) \cdot C(t) + D(t) = -\frac{1}{2}\sin(\omega_{IF})t - \frac{1}{2}\sin(2\omega_{LO} - \omega_{IF})t - \frac{1}{2}\sin(2\omega_{LO} - \omega_{IF})t + \frac{1}{2}\sin(\omega_{IF})t$
$E(t) = -\sin(2\omega_{LO} - \omega_{IF})t$ Referring to Table 2 and FIG. 7B, in the narrowband mode, the DMIRM 200 receives the filtered GSM IF signal 189 containing the narrow bandwidth GSM signal 175 centered at 191.785 MHz 410, as well as blocker signals having various frequencies and bandwidths. These signals are received by the DMIRM 200 as input signals A(t), as shown in FIG. 7B and Table 2. The second LO signal 202, shown as signals B(t) in FIG. 7B and Table 2, is chosen with a frequency 422 of 191.017 MHz, which is halfway between the GSM center frequency 410 of 191.785 MHz and 190.249 MHz, the image reject frequency 424 where the maximum image-rejection is to be achieved. The second LO frequency 422 is chosen so that the frequency of the second IF ($2^{nd}$ IF=$1^{st}$ IF–LO) can easily be generated using the WCDMA sample clock rate of 15.36 MHz so as to form a digital LO for the digital IQ demodulator 224. Moreover, the second LO frequency 422 is chosen so that the second IF signal 202 can be sampled using a sample rate easily generated using the WCDMA sample clock rate. These two benefits are achieved with a second IF frequency of 768 kHz, which can be formed by dividing the sample clock rate of 15.36 MHz by twenty, and can be sampled at a sample rate of ⅔ of 768 kHz, i.e., 1.024 MHz, with a sample rate generated by dividing the sample clock rate of 15.36 MHz by fifteen.

Table 2 above sets forth signal equations for signals A(t), B(t), C(t), D(t) and E(t) that are present on the various nodes of the circuit of FIG. 7B. The equations demonstrate that the downconversion, low-side reject image-reject mixer shown in FIG. 7B attenuates input signals A(t) that fall around an image with frequency equal to the second LO frequency 422 minus the second IF frequency of 768 kHz. The image-reject mixer passes input signals A(t) with frequencies centered at the second LO frequency 422 plus the second IF frequency, which equals the center frequency 420 of the first IF signal, which itself contains the GSM IF signal 175 with an equivalent center frequency 410. Input signals that fall around the image frequency are thereby cancelled out of the second IF frequency 422 and appear at a higher frequency output (2·LO–IF), which can be filtered out.

Demodulation

The demodulation circuit 220 receives the second IF signal from the DMIRM 200. Within the demodulation circuit 220, a sigma-delta bandpass A/D converter 222, converts the analog second IF signal 209 to a digital signal, which is then demodulated to baseband I ("In" phase) and Q ("Quadrature" phase) signals by a digital IQ demodulator 224. The output of the demodulation circuit 220 is a digital baseband signal 225, which is sent to a baseband signal processor, not shown, to recover the transmitted information. The baseband signal processors are known in the art.

Figure 8A:
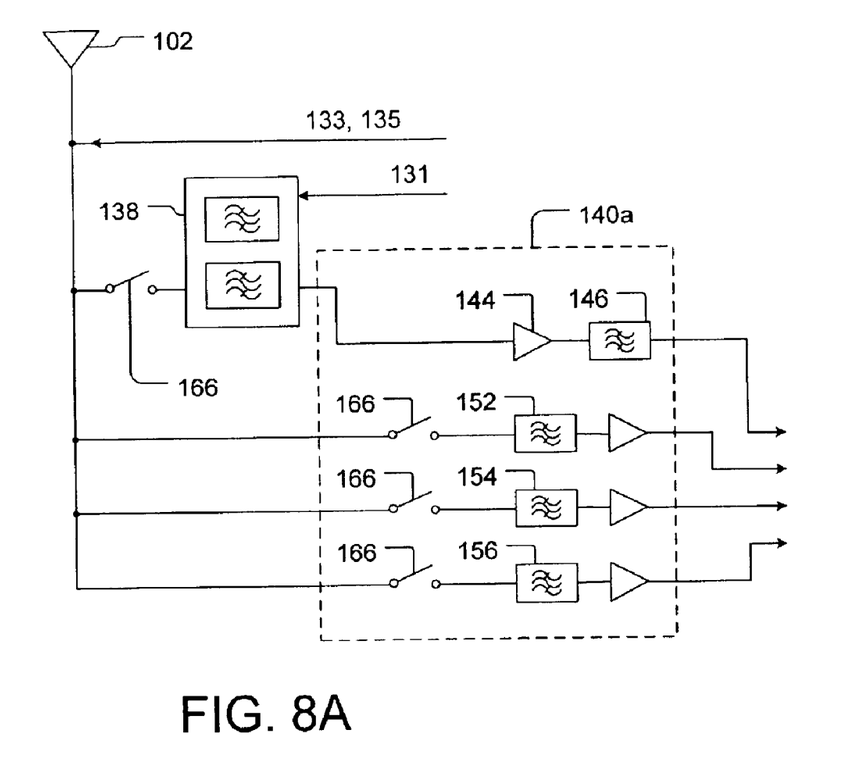
FIGS. 8A and 8B illustrate alternative configurations of portions of the RF receiver illustrated in FIGS. 2 and 3.
Figure 8B:
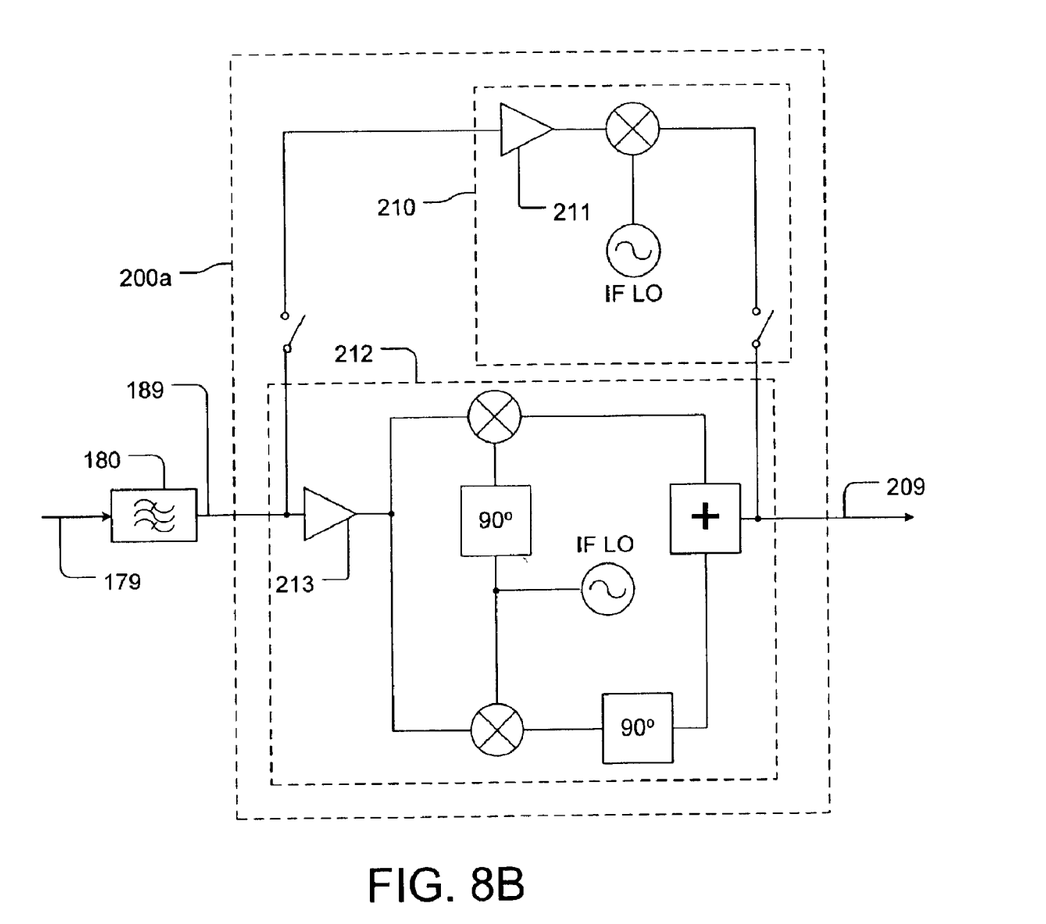

FIGS. 8A and 8B illustrates parts of the RF receiver 100 of FIG. 1 having alternative configurations compared to the configurations illustrated in FIGS. 2 and 3. Portions of FIGS. 8A and 8B are similar to portions of FIGS. 2 and 3. For convenience, portions in FIGS. 8A and 8B that are similar to corresponding parts in FIGS. 2 and 3 are assigned the same reference numerals, analogous portions are assigned the same reference numerals accompanied by letter "a," and different components are assigned different reference numerals. In FIG. 8A, the sub-switches 134 and 136 of FIG. 2 are shown as individual switches 166 to illustrate their functions. The results of the alternative configurations of the RF receiver (as shown in FIGS. 8A and 8B) are same as the configuration for the of the RF receiver illustrated in FIGS. 2 and 3; however, the embodiment shown in FIGS. 8A and 8B can results in a different cost structure for electronic components than the cost structure for the embodiment shown in FIGS. 2 and 3. This is partially because the DMIRM 200a includes a downconversion mixer 210 and an image-reject mixer 212 that do not use common mixers, low noise amplifier (LNA) 211 and 213, or local oscillators (IF LO). The DMIRM 200a routes its input signal 189 through the downconversion mixer 176 in the wideband mode and through image-reject mixer 178 in the narrowband mode.

Although a specific embodiment of the invention is described above in which both a narrow bandwidth GSM signal and a wide bandwidth WCDMA signal are processed, other embodiments are possible in which other narrow bandwidth and wide bandwidth signals conforming to other radio standards are processed.

The invention sees application in fields other than mobile communications. In one embodiment, a receiver for a cable television or a portable television processes both narrow bandwidth and wide bandwidth signals with one wide bandwidth bandpass filter and a dual-mode image-reject mixer. In another embodiment, a receiver is used in test instrumentation to detect a narrow bandwidth desired signal in the presence of a nearby wider bandwidth undesired signal.

Although certain specific exemplary embodiments are described above in order to illustrate the invention, the invention is not limited to the specific embodiments. Although the operation of a mobile station receiver according to embodiments of the present invention has been described by defining various distinct signals at each node of the receiver, the operation can instead be described by following the path of one signal as that signal travels through the various nodes of the circuit. Accordingly, various modifications, adaptations, and combinations of various features of the described embodiments can be practiced without departing from the scope of the invention as set forth in the following claims.

What is claimed is:

1. A communication apparatus including a dual mode receiver, the receiver comprising:

a narrowband signal mixer adapted to downconvert a narrowband radio frequency (RF) signal to a narrowband intermediate frequency (IF) signal, wherein the narrowband IF signal having a narrowband IF signal carrier component, a first IF noise component having frequencies outside the narrowband IF carrier component, and a second IF noise component also having frequencies outside the narrowband IF carrier component, such that the narrowband IF carrier component lies within but near a limit of a predetermined range of signal frequencies;

a bandpass filter connected to said narrowband signal mixer, said bandpass filter adapted to allow signals within the predetermined range to pass through such that, when the narrowband IF signal is introduced, the first IF noise component is filtered out while the narrowband IF carrier component and the second IF noise component passes through; and a dual-mode image-reject mixer (DMIRM) connected to said bandpass filter, said DMIRM adapted to attenuate the second IF noise component.

2. The communication apparatus recited in claim 1 wherein said DMIRM downconverts said narrowband IF signal to a second IF signal.

3. The communication apparatus recited in claim 1 further comprising a wideband signal mixer connected to said bandpass filter, said wideband signal mixer adapted to downcovert a wideband radio frequency (RF) signal to a wideband intermediate frequency (IF) signal wherein the wideband IF signal having a wideband IF carrier component and wideband noise components having frequencies outside the wideband IF carrier component and such that the wideband IF carrier component lies within a second predetermined range of signal frequencies.

4. The communication apparatus recited in claim 3 further comprising a switching system for routing the narrowband RF signal to said narrowband signal mixer and for routing the wideband RF signal to said wideband signal mixer.

5. The communication apparatus recited in claim 3 wherein the wideband RF signal conforms to the specifications of the Wideband Code Division Multiple Access (WCDMA) radio protocol standard.

6. The communication apparatus recited in claim 1 wherein said bandpass filter is a channel select filter of a type selected from a group consisting of: a thin-film bulk acoustic wave resonator filter, a surface acoustic wave filter, a multi-layer ceramic filter, an inductor-capacitor discrete-component filter, and an active filter.

7. The communication apparatus recited in claim 1 wherein the narrowband RF signal conforms to the specifications of the Global System for Mobile Communication (GSM) radio protocol standard.

8. A method of processing radio frequency (RF) signal for communication, the method comprising:

downconverting a narrowband radio frequency (RF) signal to a narrowband intermediate frequency (IF) signal wherein the narrowband IF signal having a narrowband IF carrier component, a first IF noise component having frequencies outside the narrowband IF carrier component, and a second IF noise component also having frequencies outside the narrowband IF carrier component, such that the narrowband IF carrier component lies within but near a limit of a predetermined range of signal frequencies;

filtering the first IF noise component while allowing the narrowband IF carrier component and portions of the second IF noise component to pass through; and attenuating the second IF noise component using a dual-mode image-reject mixer (DMIRM).

9. The method recited in claim 8 further comprising a step of downconverting said narrow IF signal to a second IF signal.

10. The method recited in claim 8 further comprising a step of downconverting a wideband radio frequency (RF) signal to a wideband intermediate frequency (IF) signal wherein the wideband IF signal having a wideband IF carrier component and a wideband IF noise component, such that the wideband IF carrier component lies within a second predetermined range of signal frequencies.

11. The method recited in claim 10 further comprising a step of routing the narrowband RF signal to a narrowband signal mixer and for routing the wideband RF signal to a wideband signal mixer.

12. The method recited in claim 10 wherein the wideband RF signal conforms to the specifications of the Wideband Code Division Multiple Access (WCDMA) radio protocol standard.

13. The method recited in claim 8 further wherein said filter is a bandpass channel select filter of a type selected from a group consisting of: a thin-film bulk acoustic wave resonator filter, a surface acoustic wave filter, a multi-layer ceramic filter, an inductor-capacitor discrete-component filter, and an active filter.

14. The method recited in claim 8 further wherein the narrowband RF signal conforms to the specifications of the Global System for Mobile Communication (GSM) radio protocol standard.

* * * * *